United States Patent [19]

Baumann

[11] Patent Number: 5,305,987
[45] Date of Patent: Apr. 26, 1994

[54] ECCENTRIC, ROTARY PLUG VALVE

[76] Inventor: Hans D. Baumann, 32 Pine St., Rye, N.H. 03870

[21] Appl. No.: 62,002

[22] Filed: May 17, 1993

Related U.S. Application Data

[63] Continuation-in-part of Ser. No. 894,010, Jun. 3, 1992, abandoned.

[51] Int. Cl.$^5$ .............................................. F16K 15/00
[52] U.S. Cl. ........................................ 251/298; 251/86
[58] Field of Search ..................... 251/315, 298, 86; 137/315

[56] References Cited

U.S. PATENT DOCUMENTS

| | | | |
|---|---|---|---|
| 2,998,957 | 9/1961 | Vulliez | 251/86 |
| 3,963,211 | 6/1976 | Myers | 251/298 X |
| 4,074,889 | 2/1978 | Engel | 251/298 |

Primary Examiner—John C. Fox

[57] ABSTRACT

An improved eccentric, rotary plug valve able to control fluid flow in a conduit having a plug assembly including a plug, having a spherical seating surface adjustably fastened to a hub element by a stud, a seat ring retained within a valve housing, a valve shaft engaging said hub element within the valve housing and further engaging suitable actuating means fastened to the exterior of said valve housing and having reciprocating stem motion, an elastically, deformable crank capable of locking on to said shaft and able to convert said reciprocating actuator motion into rotary shaft motion; said stud being threadingly engaged within said hub element and capable of permitting alteration of the geometric location of the center of the spherical seating surface of the plug to match it exactly with that of the seat ring in order to affect tight shut-off regardless of machining tolerances within the housing, hub, or plug, and where the geometry between plug or hub element and the housing interior is very streamlined.

5 Claims, 2 Drawing Sheets

ECCENTRIC, ROTARY PLUG VALVE

This is a continuation in part of my co-pending application filed on Jun. 3, 1992 under Ser. No. 07/894,010 in the Art Unit 3407 now abandoned.

BACKGROUND OF THE INVENTION

This invention relates to an eccentric, rotary plug valve used primarily for the modulating control of fluids in process plants. It is essentially an improvement over my similar invention patented under U.S. Pat. No. 3,623,696.

One of the requirements of such a valve is to obtain tight closure when a process system is shut down. The fact that eccentric valves have a somewhat complex geometry requires extremely accurate machining of distances between shaft center to plug seating surface, shaft center to orificial seating surface, length of contact area in the valve housing to seating area in orifice, and many others. To machine all these dimensions at very tight tolerances requires very expensive fixturing and tooling. Even if machining tolerances are held to the required level, there is also the problem of thermal expansion which, for example, is quite different for a stainless steel valve plug and a carbon steel body. All these problems have been recognized early on by experts in the field, and there are a number of patented devices that rely on various methods to solve this problem of insufficient geometrical alignment. In my U.S. Pat. No. 3,623,696 I utilize flexible arms between the hub and the plug portion of the rotary member. Various crank shaft mechanisms are shown in U.S. Pat. Nos. 3,575,376 or 1,233,856, and 3,675,894. Such solutions are not quite practical since they produce a degree of looseness between the moving parts and require a number of bearings which, while in the fluid stream, are easily contaminated or corroded. U.S. Pat. No. 4,817,916 shows a cam operated plug which again has similar drawbacks discussed previously. Other prior art is U.S. Pat. No. 3,963,211 showing a self-aligning valve plug utilizing spherical springs. This allows self-alignment in two planes but not in the horizontal direction between the shaft axis and valve seat. Also, no provisions are made to prevent the valve plug from "rattling" due to fluid turbulence. The hub or yoke is rounded for structural reasons only on very narrow sections, thereby negating any meaningful pressure recovery in the open position. U.S. Pat. No. 3,572,370 has a self-aligning plug for the horizontal direction but not for the other two planes, thereby limiting its usefulness. Additional requirements for o-ring seals severely limit the temperature range and negate applications for other than clean fluids. U.S. Pat. No. 4,074,889 shows mechanical adjustment means to control the distance between the center line of the shaft and the contact point between plug and orifice. However, this plug itself has no means for tilting and thereby will not be able to self-adjust in the other two planes. Again, yoke portions 19 are too narrow and too sharply rounded to allow for any meaningful pressure recovery as claimed in my inventions. Finally, U.S. Pat. No. 4,248,403 shows a two-part hub and plug arrangement in which a fixed extension of the hub supports the plug in a spring-loaded spherical joint. This allows for some degree of alignment. However, it does not guarantee that the center of the spherical seating surface is located on the center line of the seat ring in the correct distance relationship between plug and seat. This severely limits the sealing capability. Another problem of this invention is the fact that fluid forces tend to vibrate the plug around head portion 88 or 50. The biasing force of spring 66 is limited so as to allow rotation of plug 42 after the plug touches seat corner 76. With such a limited biasing force, there is no impediment to fluid turbulence trying to violently swing plug 42 back and forth while the valve is throttling in the open position.

SUMMARY OF THE INVENTION

My present invention overcomes these and other disadvantages of the prior art. First, it provides for a spherical bearing of my valve plug which in itself is adjustable so that the distance between the spherical seating surface of the plug and the seating chamfer of the seat ring can be matched while the center of the plug sphere is perfectly aligned (through rotation of the hub) with the axis of the seat ring. Furthermore, the hub portion has a geometry that in fact effectively covers the lower portion of my valve plug. This ensures that the lower half of my plug sees only high throttling velocity thereby creating a slight vacuum in the gap between the rear face of the plug and the front face of the hub. The upper half of the plug in contrast is subjected to the downstream pressure within the valve housing where there is always positive pressure. This pressure differential between the upper and lower halves of the rear face of the plug forces it to firmly contact the hub at its lower front face during any opening of my valve. This effectively prevents destructive vibration due to extremely high turbulence when the fluid passing through such a valve undergoes a process of pressure reduction.

Finally, the geometry of the rotating assembly of parts in my invention is configured to provide a very streamlined flow path when the valve is at or near the fully open position. This is accomplished by configuring the lower hub portions so that the flow area gradually enlarges for fluid flowing from between the seat ring and to the downstream housing cavity. The same effect is achieved near the upper portion of the plug. Here a gradually expanding flow area is provided between the spherical seating surface of my plug and the curved interior housing cavity. This way the fluid is allowed to gradually reduce in velocity and achieve a process of pressure recovery when flowing around the combination plug and hub towards the valve outlet (see FIG. 1 in my drawing). The effect of this gradual deceleration is a significant increase in flow capacity which allows me to reduce the size of my orifice diameter while maintaining a competitive flow capacity. Having a reduced orifice is again very beneficial since it greatly reduces the torsional forces that have to be absorbed by my valve shaft and it saves on the size of the required external actuating device.

The overall combination of absence of tight machining tolerances due to adjustability of the plug geometry in the assembly stages without negating the vibrational stiffness of my plug, coupled with the need for a relatively small actuating device, achieves a high degree of economy and efficiency. These and other advantages will become more apparent in light of the following descriptions:

DETAILED DESCRIPTION OF THE PREFERRED EMBODIMENT

Figure 1:
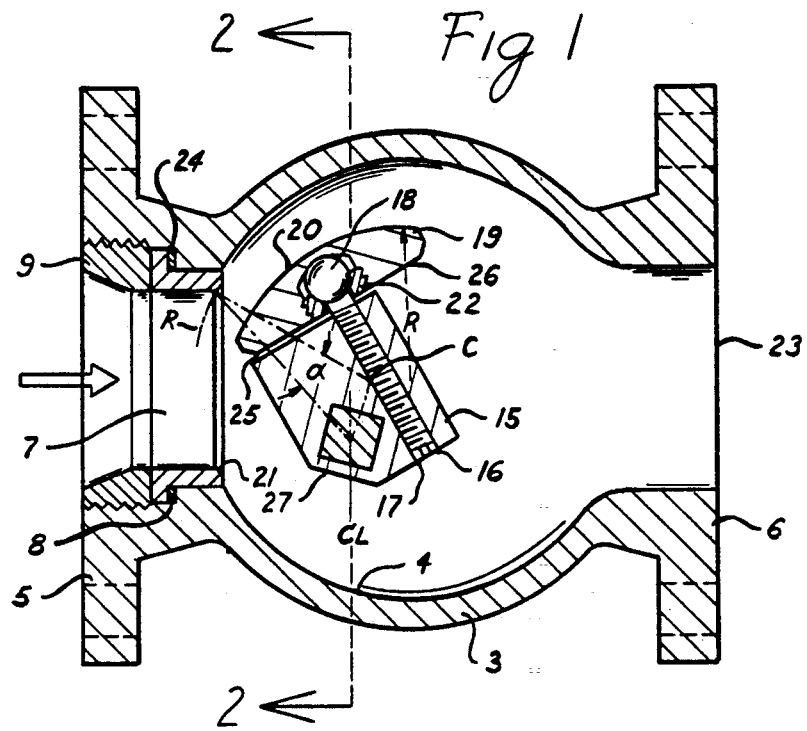
FIG. 1 is a central, cross-sectional view of my invention with the valve plug in the open position.

Referring to FIG. 1, my eccentric, rotary plug valve 10 is comprised of a housing 3 having an enlarged curved inner cavity 4, an inlet flange 5, and an outlet flange 6 both capable of being coupled to a piping system. Inlet flange 5 have a port opening retaining therein a seat ring 7 shouldered at 8 against the housing 3 and retained by a threaded ring 9. Said housing 3 further has a hollowed bonnet extension 10 which extends perpendicularly and whose axis is below the axis connecting the inlet and outlet ports. A shaft 11 extends through the length of extension bonnet 10 and is supported within the housing inner cavity 4 by bearings 12 and sealed by a suitable packing arrangement 13. One portion of shaft 11 has a square cross-section 14 which is able to slidingly engage a hub 15 having a threaded opening 16 and retaining therein a stud 17 having ball-shaped head portion 18 which rotatably supports a plug 19 having a semi-spherical front face 20 capable of sealingly engaging a chamfered seating surface 21 of seat ring 7. A threaded nut 22 keeps engagement of ball-shaped portion 18 and plug 19 snug.

When in the seated position, the radius R of the semi-spherical front face 20 is swung from a center C located a given distance downstream from center line CL of shaft 11. The angle of the dashed lines between chamfered seating surface 21, spherical center C, and center of shaft CL designed as Alpha, the "angle of approach," if chosen in excess of ten degrees, will allow me to retain the economy of using softer metals such as stainless steel for plug material. By locating spherical center C on that side of center line CL located towards the outlet port 23, I can obtain such an enlarged angle Alpha.

In the assembly stages of my valve, I will now be able to rotate the hub 15 to a position where the center C aligns horizontally with the central axis of seat ring 7. Now by turning stud 17, I can move plug 19 in the direction towards the inlet port until full seating contact is made between semi-spherical surface 20 and chamfered seating surface 21. This adjustability gives me a great degree of freedom in the machining of housing 3, seat ring 7, hub 15, and plug 19. This adjustability allows me, for example, to put a gasket 24 between shoulder 8 and the housing to prevent leakage behind the seat ring. Since gaskets are compressible, they tend to establish a high degree of uncertainty as far as the geometric location of the seat ring is concerned. Such uncertainty cannot be tolerated in the use of gaskets in other similar designs (see U.S. Pat. No. 4,248,403, for example).

To summarize, my valve plug has two independent modes of adjustment in order to achieve correct sealing contact with seat ring 7. First, plug 19 is able to rotate freely around ball-shaped head portion 18. This will ensure proper alignment of spherical center C with the center line of seat ring bore 7 in two axes, to wit the axis along shaft 11 and that lying within the vertical plane. Secondly, and this is done manually in the assembly stage, plug 19 is moved along the horizontal axis between the inlet and outlet ports to match the correct distance between semi-spherical front face surface 20 and chamfered seating surface 21 when the valve is closed.

Hub 15 is configured to prevent downstream pressure from accessing the lower rear face 25 of plug 19 during normal throttling operation. In contrast, it gives free access of the downstream pressure to the upper rear surface 26 of the plug. This pressure differential allows the downstream pressure to force plug 19 around ball-shaped head portion 18 and to have the lower portion of rear face 26 touch hub 15 at 25 to prevent uncontrolled motion of plug 19 during high fluid turbulence. This is done by having the lower portion of hub 15 cover at least fifty percent of the lower half of the lower rear face 26 while exposing at least two thirds of the upper plug rear face 26 (see FIG. 2). Typically, the gap between the flat plug rear face 25 and the similar surface configuration of hub 15 has to be kept small to prevent fluid vortexes from entering. This gap generally does not exceed fifteen percent of the diameter of the bore of seat ring 7.

Furthermore, hub 15 has a lower chamfered surface 27 which, together with the curved inner cavity 4, provides a gradually expanding fluid path. Inner cavity 4 is also configured to provide a gradually expanding flow path between semi-spherical front face 20 and itself on the upper half of housing 3 when plug 19 is in the fully open position (see FIG. 1).

Figure 3:
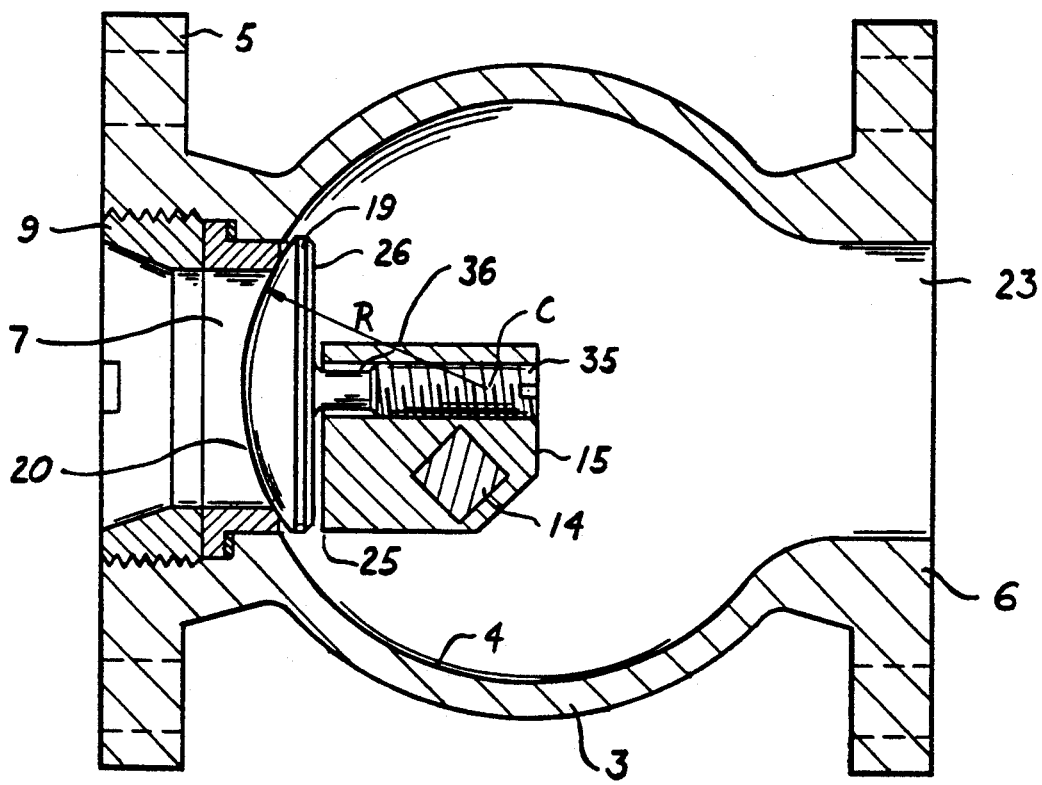
FIG. 3 is a central, cross-sectional view of a modified form of my invention where the connection between plug and hub is a flexible stud.

A somewhat simplified execution of my invention is shown in FIG. 3. Here the stud 35 is a permanent part of plug 19 and is attached to the central axis of rear surface 26. Note that stud 35 has a reduced diameter portion 36 designed to allow for some elastic deformation in order to enable plug 19 to flex in any direction in order to more perfectly align with seat ring 7. This flexural motion accomplishes the same task, although at a smaller angular displacement, as the ball-shaped head portion 18 previously described could accomplish.

Figure 2:
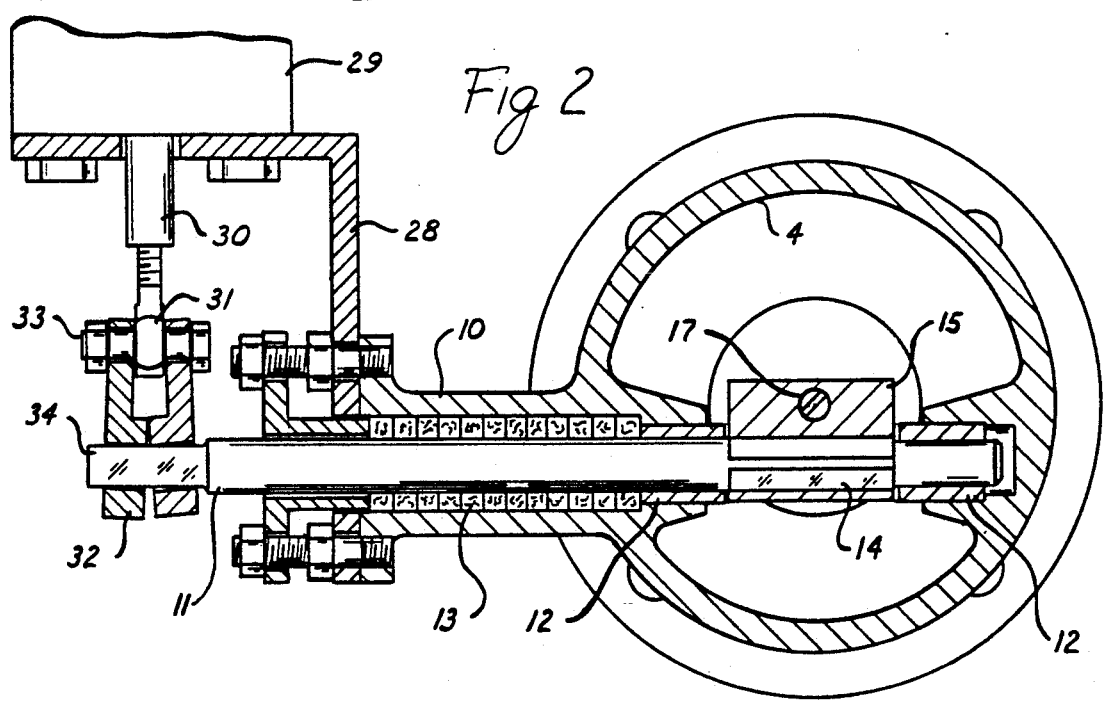
FIG. 2 is a cross-sectional view taken along the lines 2—2 in FIG. 1, with the valve plug now being shown closed.

Extension bonnet 10 supports a bracket 28 which in turn interconnects to a suitable actuating device 29 having a reciprocating stem 30 and ball joint 31. The latter connects to a pair of tiltable linkages 32 via a headbolt 33. These pairs of levers freely slide over a squared end configuration 34 of shaft 11 when headbolt 33 is disengaged. However, upon tightening of headbolt 33, both pairs of levers are tilted as shown in FIG. 2 and clamped solidly onto the square end portions 34 to provide exact rotary motion for shaft 11 following the commands of actuating device 29 without any lost motion. The functioning of these clamped on linkages is more closely explained in my U.S. Pat. No. 4,345,850.

While the invention has been explained in a preferred configuration, this shall not preclude that numerous modifications and changes may be made by those skilled in the art without departing from the spirit and scope of the invention.

I claim:

1. Eccentric, rotary plug valve comprising:
   a. a housing capable of being suitably connected to a piping system and having a co-axial inlet port and an outlet port connected by an enlarged inner cavity, said housing further having a hollow bonnet extension extending perpendicularly from the axis aligning said inlet and outlet ports;
   b. an annular seat ring having a circular bore and being suitably fastened within said housing cavity and near said inlet port whose one terminating end has a chamfered seating surface;

c. a plug adjustably connected to a hub element, the latter having an upper and a lower portion where the lower portion has a pierced opening constituting a shaft passageway whose axis being offset from that of the annular seat ring, said plug having a semi-spherical front face whose spherical radius sealingly engages the seating surface of the seat ring and a flat rear face having a lower and upper portion and a centrally attached stud with a threaded rear portion connecting with a similarly threaded opening within said hub element and capable of adjustably moving said plug towards or away from said seat ring and into a correct geometric relationship with said seat ring when the plug is sealingly engaged with said seat ring, said hub element having a lower portion having a surface complementing that of the rear face of the plug and configured to cover at least one half of the lower rear face and less than one third of the upper rear face of said plug and being separated from said plug surface by no more than fifteen percent of the diameter of the circular seat ring bore to effectively prevent fluid pressure established near the outlet port and within the housing cavity from affecting the lower portion of the rear face of said valve plug when the latter is not sealingly engaging said seat ring;

d. a shaft rotably mounted within said hollow bonnet extension and further extending into the pierced opening of said hub element and capable of rotating said hub element together with the adjustably attached plug towards said seat ring in order to affect the a sealing engagement with the latter.

2. Eccentric, rotary plug valve of claim 1, where the rear face of said plug has a central opening for receiving and retaining a stud with an enlarged, ball-shaped head and a threaded rear portion connecting with a similarly threaded opening with said hub element.

3. Eccentric, rotary plug valve of claim 1, where the center of the spherical radius forming the front face of said plug is located at a point extending beyond the axis of said hollow bonnet extension towards the outlet port of said housing.

4. Eccentric, rotary plug valve of claim 1, wherein the lower portion of said hub element is configured to provide a gradually expanding flow path between said lower portion and the enlarged inner cavity of said housing when the hub and attached plug are rotated by said shaft into an open position in order to allow for gradual deceleration of the passing fluid between the seat ring bore and the outlet port and thereby decrease the headloss of the valve and increase the flow capacity of the valve.

5. Eccentric, rotary plug valve of claim 1, wherein the enlarged inner cavity of said housing is shaped to provide a gradually expanding flow path between itself and the spherical front face of said plug when the latter is rotated into an open valve position in order to allow for gradual deceleration of the passing fluid between said orifice bore and the outlet port and thereby decrease the headloss of the valve.

* * * * *